July 13, 1948.  E. A. FERGUSON  2,444,983
LUMBER FOOTAGE CALCULATOR
Filed March 8, 1946  5 Sheets-Sheet 1

INVENTOR
E. A. Ferguson
ATTORNEYS

July 13, 1948.   E. A. FERGUSON   2,444,983
LUMBER FOOTAGE CALCULATOR
Filed March 8, 1946   5 Sheets-Sheet 2
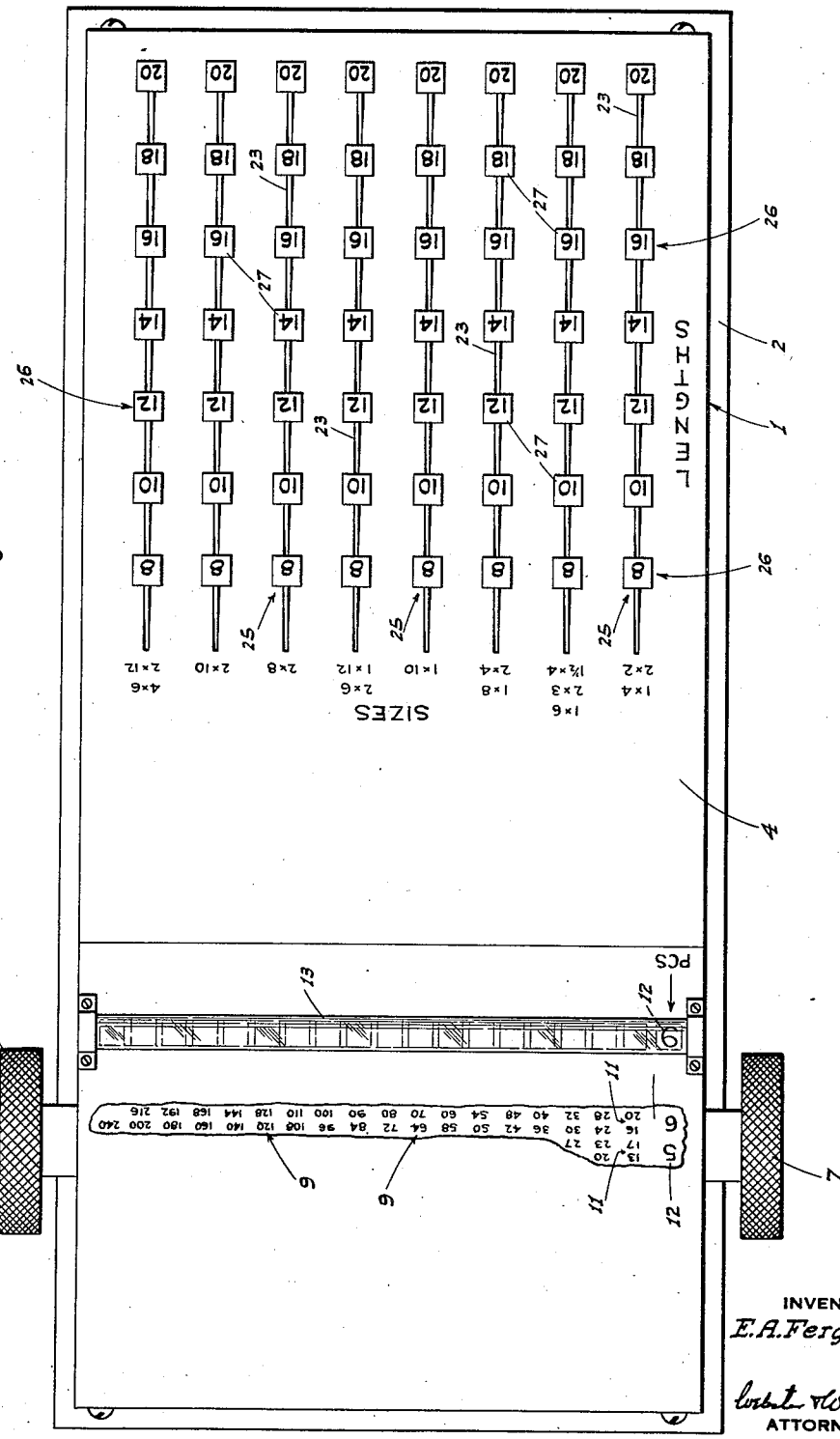
INVENTOR
E. A. Ferguson
ATTORNEYS

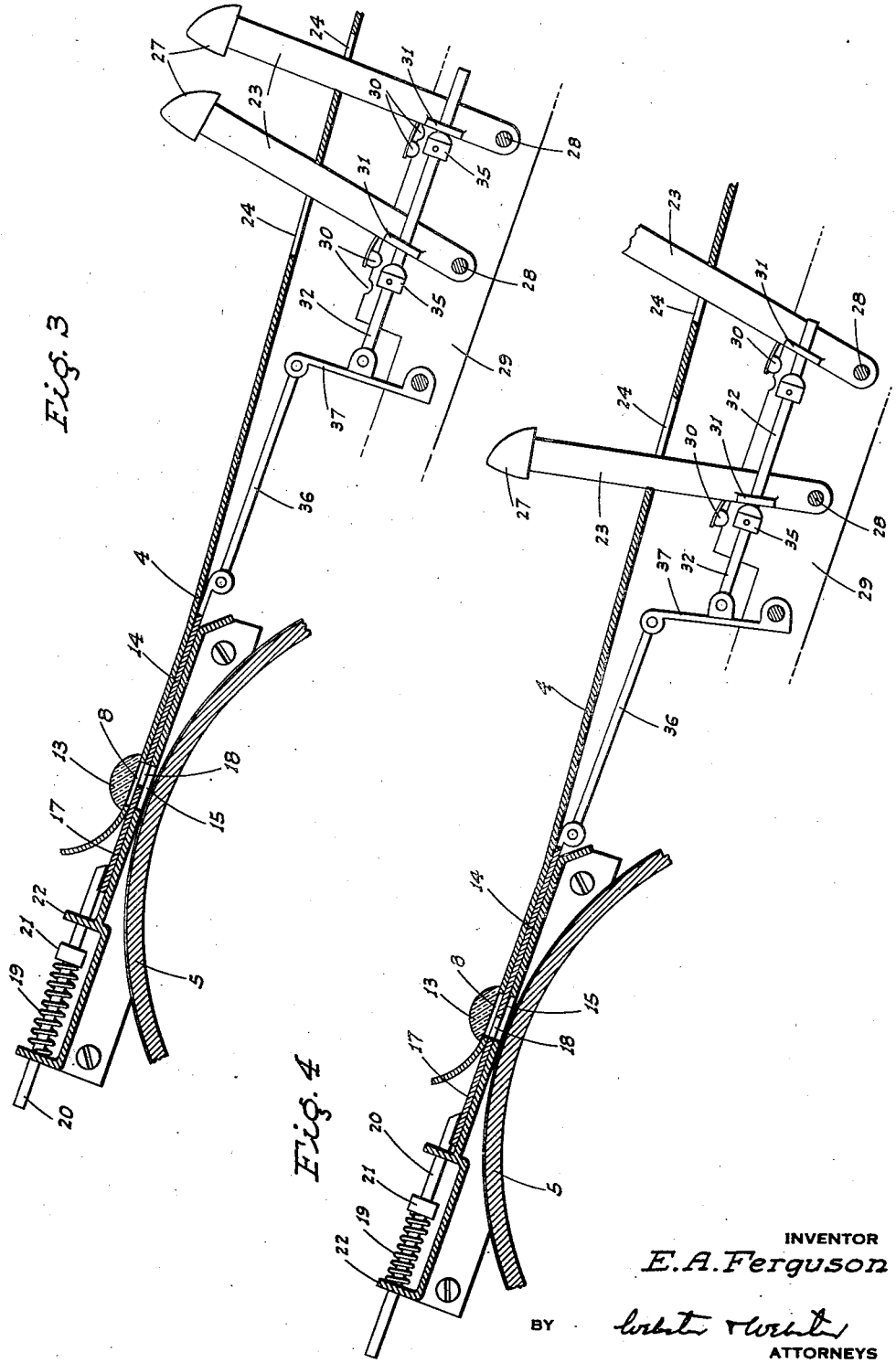
July 13, 1948.   E. A. FERGUSON   2,444,983
LUMBER FOOTAGE CALCULATOR
Filed March 8, 1946   5 Sheets-Sheet 3
INVENTOR
E. A. Ferguson
BY
ATTORNEYS July 13, 1948.　　　　　E. A. FERGUSON　　　　　2,444,983
LUMBER FOOTAGE CALCULATOR
Filed March 8, 1946　　　　　　　　　　　　　　5 Sheets-Sheet 4
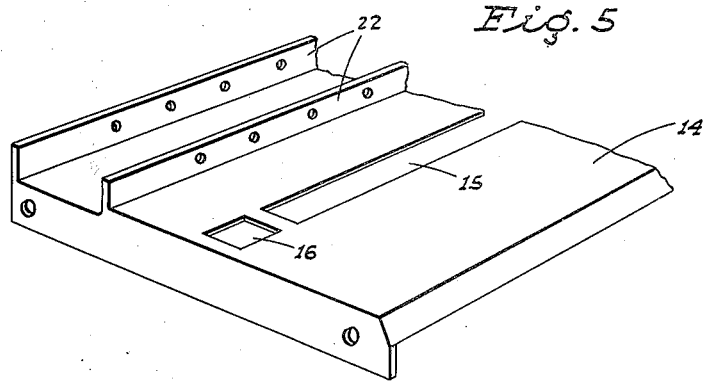
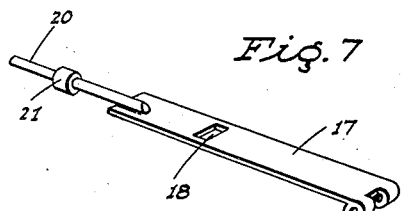
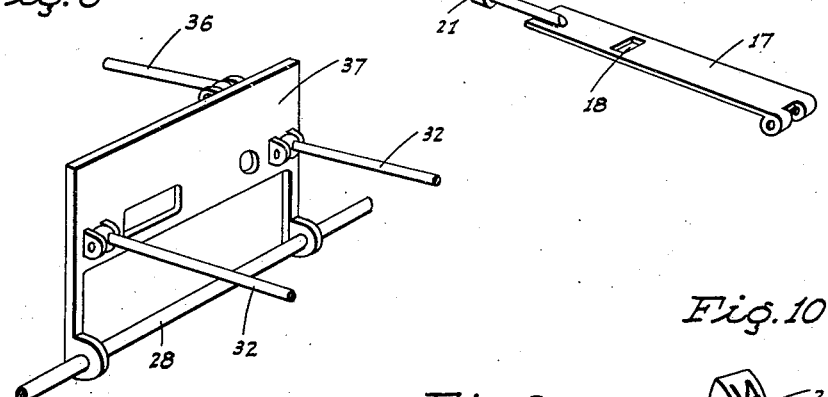
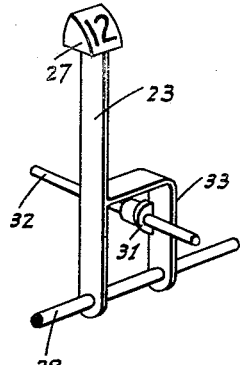
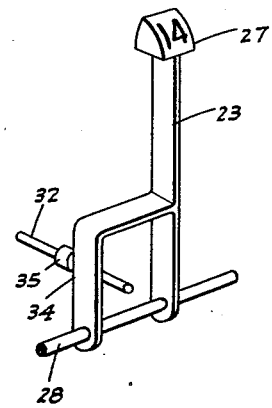
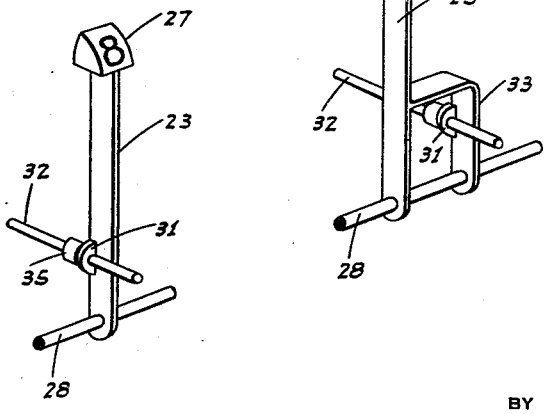
INVENTOR
E. A. Ferguson
BY
ATTORNEYS Patented July 13, 1948

2,444,983

UNITED STATES PATENT OFFICE 2,444,983

LUMBER FOOTAGE CALCULATOR

Elmo A. Ferguson, North Sacramento, Calif.

Application March 8, 1946, Serial No. 653,091

13 Claims. (Cl. 235—87)

1

This invention is directed to, and it is an object to provide, an improved and yet simplified calculating machine for the purpose of easy and rapid computation of the total lumber footage in a given number of pieces of lumber of known dimensions.

While the machine is especially designed to compute lumber footage as in mills, lumber yards, etc., it may be put to other uses by employing different keyboard indicia and scales, as will be obvious.

Another object of the invention is to provide a lumber footage calculator operative to provide a relatively wide range of computations; i. e. to embrace lumber of many different dimensions, both in length and cross sectional size.

A further object of this invention is to provide a lumber footage calculator which is light weight, small in size, and thus readily portable, as is desirable.

A further object of the invention is to provide a practical lumber footage calculator, and one which will be exceedingly effective for the purposes for which it is designed.

These objects are accomplished by means of such structure and relative arrangement of parts as will fully appear by a perusal of the following specification and claims.

In the drawings:

Fig. 2 is a plan view.

Fig. 3 is an enlarged, fragmentary sectional elevation illustrating the actuating mechanism between two adjacent key levers in one longitudinal row thereof and the corresponding shutter; the shutter being in the position occupied thereby when one key lever is advanced.

Fig. 4 is a similar view, but illustrating the different position of said corresponding shutter when the other key lever is advanced.

Fig. 5 is a fragmentary perspective view of the shutter supporting and guide plate, detached.

Fig. 6 is a fragmentary perspective view illustrating one of the connector plates as coupled between the corresponding key lever actuated thrust rods and corresponding shutter actuating rod.

Fig. 7 is a perspective view of one of the shutters, detached.

Fig. 8 is a fragmentary perspective view illustrating a key lever and the connection with its thrust rod.

Fig. 9 is a fragmentary perspective view, illustrating a key lever provided with a right offset leg for connection with the corresponding thrust rod which is similarly offset to provide proper spacing between said thrust rods in the machine.

Fig. 10 is a similar view but illustrates a key lever with a left offset leg.

Figure 1:
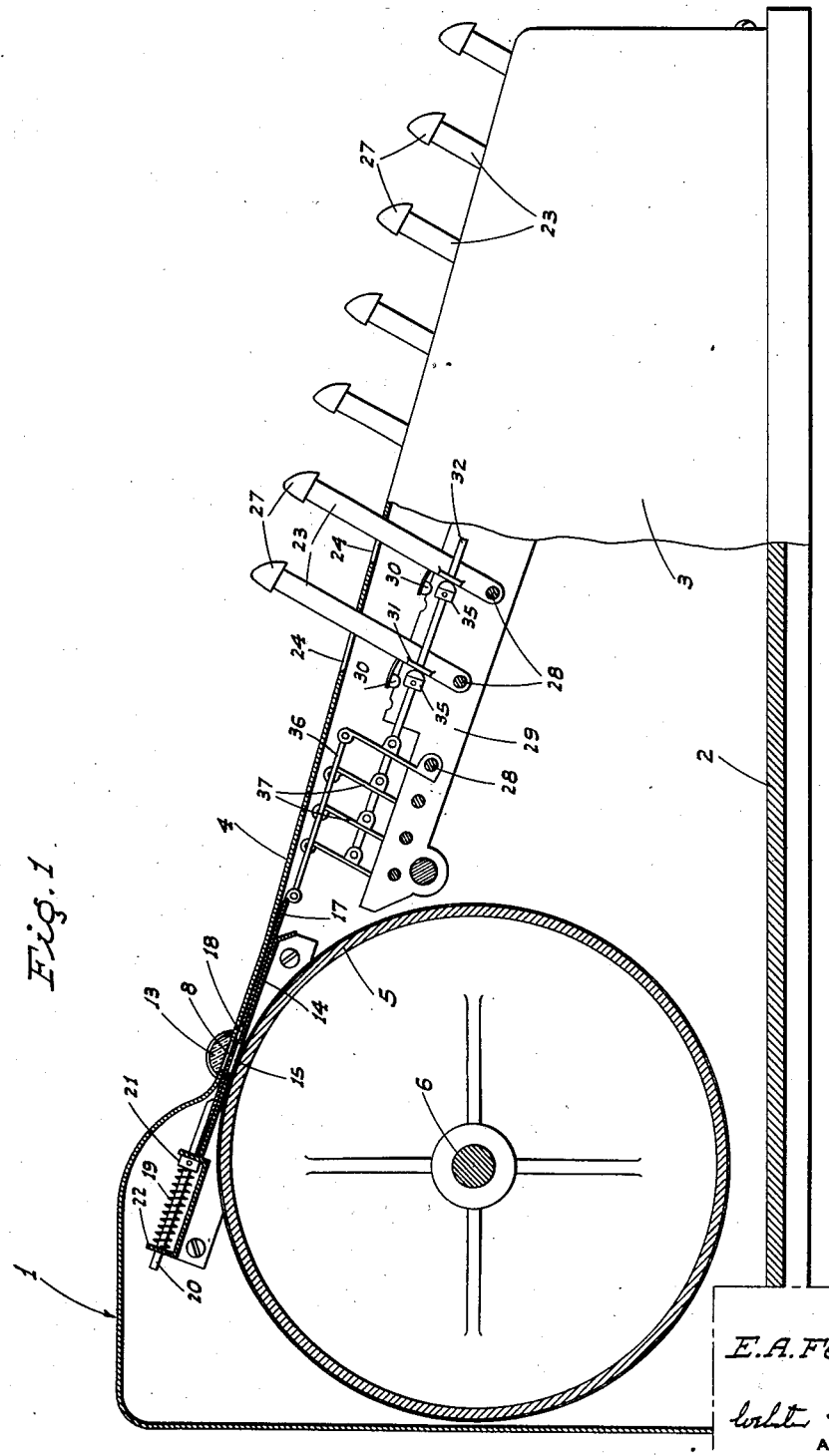
Fig. 1 is a side elevation of the machine, partly in section.

Referring now more particularly to the characters of reference on the drawings, the machine comprises a relatively small, elongated case 1 of approximately the same size as a conventional counter type adding machine; said case including a base 2, sides 3, and an inclined top plate 4.

A cylinder 5 is journaled transversely in the case 1 under the high end of the inclined top plate 4, and includes a shaft 6 whose ends are fitted with hand knobs 7 outwardly of the sides 3 of the case.

Adjacent the top of the cylinder 5 the top plate 4, which is tangentially adjacent but spaced from said cylinder, is formed with a transverse slot 8 which extends substantially from side to side of the case; such slot being of relatively narrow but constant width, as shown.

Imprinted on the cylinder is a scale which comprises a multiplicity of transverse rows 9 of figures disposed in symmetrical spaced relation both transversely and circumferentially of the cylinder; such figures each representing—by pre-calculation—the total footage in a certain number of pieces of lumber of given length and cross sectional dimensions.

The transverse rows 9 of figures are in pairs 11, with each pair of rows identified at one end by a larger numeral 12. The larger numerals 12 represent the number of pieces of lumber in the lot being calculated. Thus, when the cylinder 5 is rotated to register the pair 11 of rows 9 corresponding to one of the numerals 12 in the slot 8, the then registering pre-calculated figures of said rows individually represent the total lumber footage which different lots of lumber of given dimensions would contain, when the pieces of lumber correspond in number to the number represented by said one numeral 12 which then also registers with the slot at one end of the latter. The slot 8 is of a width such that only one pair 11 of rows 9 can register therewith at a time.

A magnifying glass 13 is mounted on top plate 14 and overlies the slot 8 to facilitate reading of the figures of rows 9.

A flat, shutter supporting and guide plate 14 is mounted in the case between the top plate 4 and the cylinder 5 in spaced relation to both thereof, parallel to top plate 4, and tangential to said cylinder. The plate 14 includes a transverse slot 15 which registers in matching relation with slot 8, and a window 16 in said plate 14 is disposed to expose the numeral 12 when the corresponding pair 11 of rows 9 is in register with said slots 8 and 15.

A plurality of flat, elongated shutters 17 rest on plate 14, between the latter and the top plate 4, in intersecting relation to slots 8 and 15 whereby to normally prevent viewing of the figures of the rows 9 in register with said slots. The numerals 12 are always exposed through slot 8 and window 16. The shutters 17 correspond in number to and are alined with corresponding ones of the figures which appear in each row 9, which rows of each pair 11 are hereinafter termed the upper row and lower row.

The shutters 17 each include a window 18 of a height approximately one-half the width of the matching slots 8 and 15 so that in different longitudinal positions of any shutter, the corresponding window 18 can expose to view only one of the adjacent and corresponding figures in the upper and lower rows of the then registering pair 11.

The shutters are normally spring retracted, with the windows 18 short of the slots 8 and 15, by means of compression springs 19 on push rods 20 bearing against collars 21 on said rods; the latter being fixed on and projecting upwardly from the upper ends of the shutters and slidably extending through upstanding flanges 22 on plate 14 above slot 15.

A plurality of upstanding key levers 23 are disposed in the case and project upwardly therefrom through slots 24 which limit the throw of said levers; the latter being disposed symmetrically to provide longitudinal rows 25 and transverse rows 26 of keys 27 on the upper ends of said levers. The keys 27 in each longitudinal row 25 are numbered to represent different standard lengths of lumber, as indicated by the words "Lengths" in Fig. 2, while the keys of the transverse rows 26 represent lumber of different cross sectional dimensions, as indicated by the headings termed "sizes" in said figure of the drawings.

In the case 1, and below top plate 4, each key lever is mounted on a cross shaft 28 for swinging motion lengthwise of the machine, and flat, longitudinal ribs 29 are disposed vertically on edge adjacent the key levers of each longitudinal row 25 in supporting relation to said cross shafts. The key levers are releasably held in retracted and advanced position by spring pressed detent units 30 cooperating between the key levers 23 and adjacent ribs 29.

Each key lever 23 includes a laterally projecting ear 31 through which a longitudinal thrust rod 32 slidably extends; each thrust rod passing through the ears of a pre-selected number of the key levers in a corresponding longitudinal row 25. In order to obtain proper spacing of the thrust rods, the ears 31 may be directly on the key lever, as in Fig. 8, or on right or left offset legs 33 and 34, as shown in Figs. 9 and 10, respectively.

The thrust rods 32 have collars 35 thereon ahead of and normally closely adjacent the ears 31 so that when the key levers are swung forwardly, the corresponding thrust rod is likewise advanced; the throw of certain of the key levers—as limited by the length of slots 24 in top plate 4—being greater than the throw of others for the reason hereinafter described. As the collars 35 are free to advance relative to the key levers not manually actuated, movement of one key lever in a longitudinal row 25 does not move any of the others therein.

Shutter actuating rods 36 are pivoted in connection with the rear ends of shutters 17 and extend rearwardly therefrom to pivotal connection with a corresponding connector plate 37; the connector plates being disposed in upstanding, transverse positions and pivotally mounted on cross shafts 28 for swinging movement lengthwise of the machine. The connector plates are spaced from each other both lengthwise and transversely of the machine so that any one can swing without interfering with others thereof.

One or more of the thrust rods 32 are pivotally attached to each of the connector plates 37 at the rear; the width of such plates varying dependent on the number of attached thrust rods.

Figure 11:
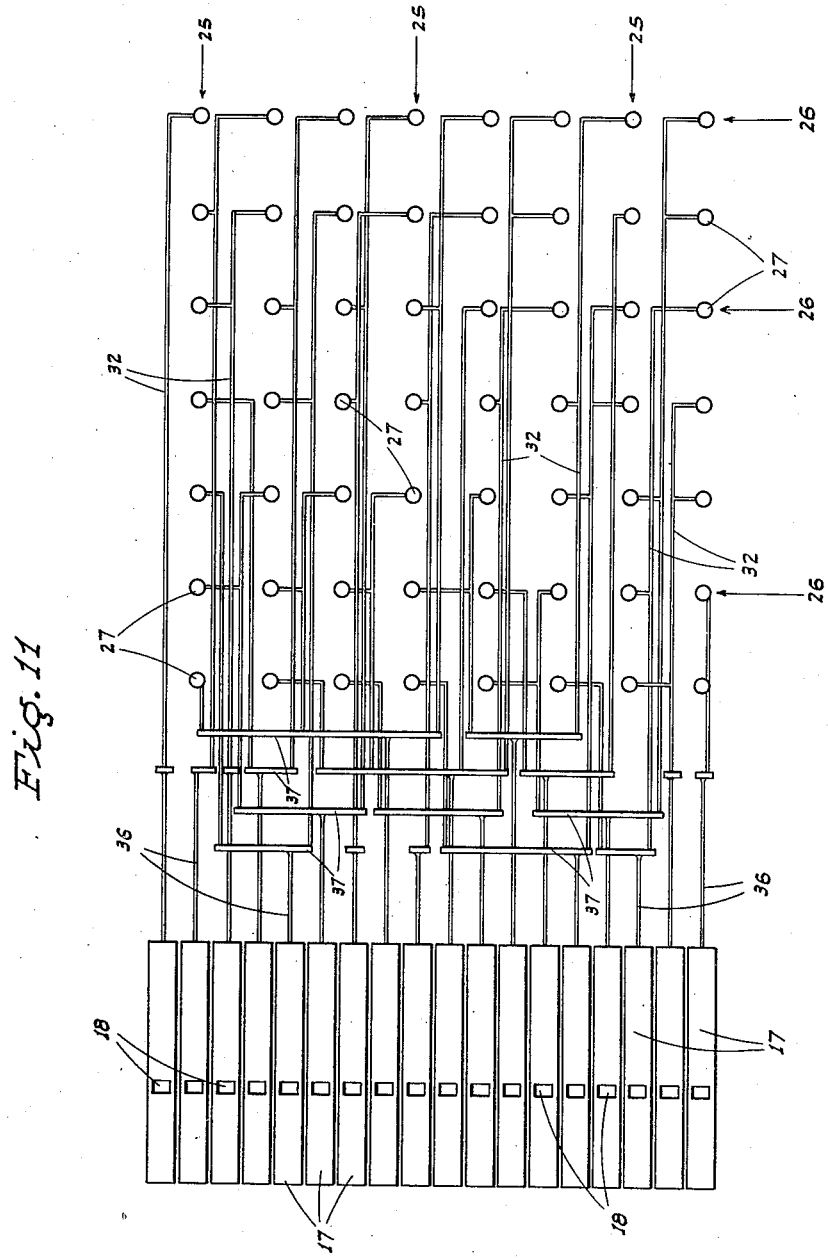
Fig. 11 is a diagrammatic plan view of the assembly of key levers, thrust rods, connector plates, shutter actuating rods, and shutters.

Fig. 11 of the drawings illustrates, in plan and diagrammatically, the relative lengths and positions of the connector plates in the present form of the calculator.

The reason for a number of the thrust rods attaching to the same connector plate 37 resides in the fact that the corresponding key levers, while representing lumber of different lengths and sizes, total the same footage, so that a single shutter 17 can expose to view the figure on the scale, on the cylinder, which corresponds to such total footage, as will be obvious from the following description of operation of the machine.

To determine the total footage in a quantity of lumber of known and common length and cross sectional dimension or size, the operator of the machine first rotates the cylinder 5 until the large numeral 12 representing the number of pieces of lumber appears in the window 16. This brings a corresponding pair 11 of rows 9 of figures into register with the matching slots 8 and 15; which figures of said rows represent—by precalculation—the total footage which such a number of pieces of lumber would contain when of given common lengths and sizes.

The operator then selects the key 27 which represents such length and size of the lumber being calculated, and engages such key in a manner to swing the same forward from a retracted to an advanced position. This movement, through the connections comprising the corresponding thrust rod 32, connector plate 37, and shutter actuating rod 36, causes the corresponding shutter to move forward a certain distance sufficient to expose one of the figures of the then registering pair of rows 9 of the scale. This figure is pre-calculated and positioned on the scale to correctly indicate, when so exposed, the total footage—for the known number of pieces—of lumber of the length and size represented by the selected and actuated key 27.

In order to avoid the necessity of a great number of shutters and a substantially larger scale, one shutter serves for cooperation with a pair of corresponding figures, and depending on the stroke of the shutter. Thus, certain of the key levers have a short stroke and others a longer stroke whereby to cause the corresponding shutter window to expose a figure in the lower row or upper row, respectively. In fact, the shutter windows 18 are approximately half the width of the matching slots 8 and 15, and the long and short stroke key levers move a proportionate distance.

Not only is the described lumber footage calculator operative to indicate total footage of a quantity of lumber, as above explained, but it may also be used to determine how many pieces of lumber of given common length and size would be required for a certain total footage. This is ascertained by movement of the key 27 corresponding to the given length and size, which opens a certain shutter. Then, by turning the cylinder until the figure corresponding to such total footage appears in the window of the open shutter, the correct indicia of the number of pieces will appear in window 18.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined in the appended claims.

Having thus described the invention, the following is claimed as new and useful, and upon which Letters Patent are desired:

1. A calculator comprising a case including a top plate having a transverse window forming slot therein, a precalculated scale mounted in the case and having a transverse row of figures in register with the window, a plurality of longitudinal, normally closed shutters slidably mounted in the case over the scale in position so that opening of each shutter exposes a corresponding figure of the scale to view, a keyboard on the case, the keys of said key board having indicia associated therewith corresponding to the figures of the scale, and operating connections between the keys and shutters; a number of different keys corresponding to the same figure of the scale, and the operating connections coupling said different keys to the one shutter for said same figure.

2. A calculator comprising a case including a top plate having a transverse window forming slot therein, a precalculated scale mounted in the case and having a transverse row of figures in register with the window, a plurality of longitudinal, normally closed shutters slidably mounted in the case over the scale in position so that opening of each shutter exposes a corresponding figure of the scale to view, a keyboard on the case, the keys of said key board having indicia associated therewith corresponding to the figures of the scale, and operating connections between the keys and shutters; a number of different keys corresponding to the same figure of the scale, and the operating connections coupling said different keys to the one shutter for said same figure, the operating connections being arranged whereby each of said different keys may be actuated independent of the others thereof.

3. A calculator comprising a case including a top plate having a transverse window forming slot therein, a precalculated scale mounted in the case and having a transverse row of figures in register with the window, a plurality of longitudinal, normally closed shutters slidably mounted in the case over the scale in position so that opening of each shutter exposes a corresponding figure of the scale to view, a keyboard on the case, the keys of said keyboard having indicia associated therewith corresponding to the figures of the scale, an actuating rod connected to each shutter and extending longitudinally toward the keyboard, the keyboard including a plurality of upstanding key levers longitudinally swingably mounted in the case, thrust rods secured to each key lever and extending toward the shutters, a plurality of upstanding connector members mounted in the case for swinging movement lengthwise thereof, and means connecting adjacent ends of the corresponding actuator rods and thrust rods to said connector members.

4. A calculator comprising a case including a top plate having a transverse window forming slot therein, a precalculated scale mounted in the case and having a transverse row of figures in register with the window, a plurality of longitudinal, normally closed shutters slidably mounted in the case over the scale in position so that opening of each shutter exposes a corresponding figure of the scale to view, a keyboard on the case, the keys of said keyboard having indicia associated therewith corresponding to the figures of the scale, an actuating rod connected to each shutter and extending longitudinally toward the keyboard, the keyboard including a plurality of upstanding key levers longitudinally swingably mounted in the case, thrust rods secured to each key lever and extending toward the shutters, a plurality of upstanding connector members mounted in the case for swinging movement lengthwise thereof, and means connecting adjacent ends of the corresponding actuator rods and thrust rods to said connector members; there being a greater number of key levers than shutters, certain separate key levers corresponding to the same shutter and figure of the scale, and the thrust rods of said certain key levers being attached to a common connector member.

5. A calculator as in claim 4 in which the connector members are upstanding, transverse plates pivoted adjacent one edge thereof for said swinging motion; the thrust rods of said certain key levers being pivotally attached to the adjacent face of corresponding plates.

6. A calculator comprising a case including a top plate having a transverse window forming slot therein, a precalculated scale mounted in the case and having a transverse row of figures in register with the window, a plurality of longitudinal, normally closed shutters slidably mounted in the case over the scale in position so that opening of each shutter exposes a corresponding figure of the scale to view, a keyboard on the case, the keys of said keyboard having indicia associated therewith corresponding to the figures of the scale, and operating connections between the keys and shutters; the keys being in longitudinal rows and mounted on longitudinally swingable key levers, and said operating connections including thrust rods, elements on the key levers through which predetermined ones of the rods slidably project, and collars on said thrust rods closely adjacent and ahead of the elements on the key levers.

7. A calculator comprising a case including a top plate having a transverse window forming slot therein, a precalculated scale mounted in the case and having a transverse row of figures in register with the window, a plurality of longitudinal, normally closed shutters slidably mounted in the case over the scale in position so that opening of each shutter exposes a corresponding figure of the scale to view, a keyboard on the case, the keys of said keyboard having indicia associated therewith corresponding to the figures of the scale, and operating connections between the keys and shutters; the keys being in longitudinal rows and mounted on longitudinally swingable key levers, and said operating connections including thrust rods, elements on the key levers through which predetermined ones of the rods slidably project, a number of the thrust rods projecting through the elements of more than one key lever in the same longitudinal row, and collars on the thrust rods closely adjacent and ahead of the elements.

8. A calculator comprising a case including a top plate having a transverse window forming slot therein, a precalculated scale mounted in the case and having a pair of transverse rows of figures in register with the window, corresponding figures on said rows being substantially alined, a plurality of longitudinal, normally closed shutters slidably mounted in the case in position so that each shutter works over corresponding figures of said rows, each shutter having a window therein of a size to register only with one of said corresponding figures at a time upon longitudinal sliding adjustment of the shutter, a keyboard on the case, the keys of said keyboard having indicia associated therewith corresponding to the figures of the scale, and operating connections between the keys and shutters; certain of the keys being arranged in operative relation to the same shutter, and means limiting the throw of different ones of said certain keys so that the shutter window thus registers with different ones of said corresponding figures upon actuation of such keys.

9. A calculator comprising a case including a top plate having a transverse window forming slot therein, a precalculated scale mounted in the case and having a pair of transverse rows of figures in register with the window, corresponding figures on said rows being substantially alined, a plurality of longitudinal, normally closed shutters slidably mounted in the case in position so that each shutter works over corresponding figures of said rows, each shutter having a window therein of a size to register only with one of said corresponding figures at a time upon longitudinal sliding adjustment of the shutter, a keyboard on the case, the keys of said keyboard having indicia associated therewith corresponding to the figures of the scale, pivotally mounted key supporting levers mounted in the case for longitudinal swinging movement, and operating connections between the key levers and corresponding shutters; said operating connections including longitudinal thrust rods extending adjacent a plurality of longitudinally alined key levers, elements on said key levers through which the corresponding thrust rod slidably projects, collars on the thrust rods directly ahead of said elements, and means to differentially limit the stroke of certain of said longitudinally alined key levers.

10. A calculator comprising a case including a top plate having a transverse window forming slot therein, a transversely disposed movable scale element in the case below the window, such scale having transversely disposed rows of figures means to move the scale element to selectively bring certain predetermined ones of said figures into register with the window, a plurality of longitudinally slidable shutters mounted in the case and crossing the window transversely thereof and normally disposed in closed position across the window, means to selectively move said shutters to expose figures through the window, such latter means comprising a key board including a plurality of keys, and means operatively connecting a number of the keys with a single shutter whereby upon manipulation of either of said number of keys the shutter will be moved to uncover the casing window and expose the figures therebelow.

11. A calculator as in claim 10 in which said last named means comprises a pivoted lever, a link connecting a shutter with said lever, a rod linked to the opposite side of said lever and projecting away from the same toward the said number of keys, the keys each including a pivoted lever, slides on each of the several levers, the rod projecting through all of said slides, a collar on the rod ahead of each slide, yieldable means normally holding all the collars against the slides when the shutter is in closed position, the manipulation of any one of said keys pushing the corresponding slide against its adjacent collar to cause the rod to swing the shutter lever and move the shutter.

12. A calculator mechanism which includes a casing having a window slot, means to display a pair of figures through the window, said figures being alined transversely of the window, a slidable shutter normally closing view through the window and itself provided with a window to register with the casing window upon manipulation of the shutter, such shutter window being of a size to expose to view only one of said alined figures at a time, means to move the shutter to selectively expose one or the other of said figures, such latter means including a pair of keys and lever and link connections between the keys and shutter and operable upon movement of one key to move the shutter to bring the shutter window into register with the casing window above one of the alined numbers and upon operation of the other key to move the shutter to bring the shutter window into register with the casing window above the other of the alined numbers.

13. A mechanism as in claim 12 in which each key of the pair of keys includes a pivoted lever, each lever having a different length of stroke, a pivoted lever disposed between the key levers and the shutter, connecting the last named lever with the shutter and a push rod connected with the first named levers and engageable by each of the key levers.

ELMO A. FERGUSON.

REFERENCES CITED

The following references are of record in the file of this patent:

UNITED STATES PATENTS

| Number | Name | Date |
| --- | --- | --- |
| 1,205,875 | Enberg | Nov. 21, 1916 |
| 1,228,385 | Arrington et al. | June 5, 1917 |
| 1,293,392 | Fassa | Feb. 4, 1919 |
| 2,189,825 | Waugh | Feb. 13, 1940 |